United States Patent
Hart

(10) Patent No.: US 11,616,654 B2
(45) Date of Patent: Mar. 28, 2023

(54) SECURE PROVISIONING OF INTERNET OF THINGS DEVICES, INCLUDING ELECTRONIC LOCKS

(71) Applicant: Spectrum Brands, Inc., Middleton, WI (US)

(72) Inventor: James Creighton Hart, Huntington Beach, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 16/392,816

(22) Filed: Apr. 24, 2019

(65) Prior Publication Data

US 2019/0327098 A1    Oct. 24, 2019

Related U.S. Application Data

(60) Provisional application No. 62/662,070, filed on Apr. 24, 2018.

(51) Int. Cl.
| | |
|---|---|
| *H04L 29/06* | (2006.01) |
| *H04L 9/32* | (2006.01) |
| *H04L 9/30* | (2006.01) |
| *E05B 45/06* | (2006.01) |
| *E05B 47/00* | (2006.01) |

(52) U.S. Cl.
CPC ............ *H04L 9/3268* (2013.01); *E05B 45/06* (2013.01); *E05B 47/0001* (2013.01); *H04L 9/3073* (2013.01); *E05Y 2900/132* (2013.01)

(58) Field of Classification Search
CPC ....... G06F 21/00; H04L 12/00; H04L 9/3268; H04L 9/3073; H04L 63/0823; E05B 45/06; G07C 2209/02
See application file for complete search history.

(56) References Cited

U.S. PATENT DOCUMENTS

| | | | |
|---|---|---|---|
| 9,241,270 B1 * | 1/2016 | Logue | ..................... G06F 21/44 |
| 9,600,726 B2 | 3/2017 | Kirkby et al. | |
| 9,647,996 B2 | 5/2017 | Johnson et al. | |
| 9,692,748 B2 | 6/2017 | Maheswari et al. | |
| 9,716,595 B1 | 7/2017 | Kravitz et al. | |
| 9,727,328 B2 | 8/2017 | Johnson | |
| 2007/0067620 A1 | 3/2007 | Jevans | |

(Continued)

FOREIGN PATENT DOCUMENTS

| | | |
|---|---|---|
| CN | 101951315 A | 1/2011 |
| EP | 3 113 513 A1 | 4/2017 |

(Continued)

OTHER PUBLICATIONS

International Search Report and Written Opinion for Application No. PCT/US2019/028745 dated Aug. 30, 2019.

*Primary Examiner* — Joseph P Hirl
*Assistant Examiner* — Leynna Truvan
(74) *Attorney, Agent, or Firm* — Merchant & Gould P.C.

(57) ABSTRACT

Methods and systems for configuring a security device, such as an electronic lock, are disclosed. In particular, the present disclosure describes methods and systems for provisioning a lock with a certificate such that any change to the lock, or changes to lock-server communication characteristics, can be detected and (optionally) prevented. As such, security of such devices is improved.

18 Claims, 17 Drawing Sheets

(56) References Cited

U.S. PATENT DOCUMENTS

| | | | |
|---|---|---|---|
| 2013/0326214 A1* | 12/2013 | McCanna | H04L 9/3268 |
| | | | 713/156 |
| 2016/0088026 A1 | 3/2016 | Mohamad Abdul et al. | |
| 2016/0142215 A1* | 5/2016 | Kruegel | H04L 9/3268 |
| | | | 713/158 |
| 2016/0189459 A1 | 6/2016 | Johnson et al. | |
| 2016/0277362 A1* | 9/2016 | Baumgarte | H04L 67/02 |
| 2017/0067620 A1 | 3/2017 | Sano et al. | |
| 2017/0302656 A1* | 10/2017 | Ramatchandirane | |
| | | | H04L 63/166 |
| 2017/0311115 A1 | 10/2017 | Adrangi et al. | |
| 2017/0330226 A1* | 11/2017 | Kuenzi | H04W 12/06 |
| 2018/0018663 A1 | 1/2018 | Van et al. | |
| 2018/0114387 A1 | 4/2018 | Klink et al. | |
| 2018/0181774 A1* | 6/2018 | Boivie | G11C 16/14 |

FOREIGN PATENT DOCUMENTS

| | | |
|---|---|---|
| MX | 2016014104 A | 4/2018 |
| WO | 2016149355 A1 | 9/2016 |

\* cited by examiner

| Cert Name | ff77dc6cacfc577685b2a1fd16cd1990c73aca360... |
| Common Name: | XXXXXXXXXXXXXX |
| Organization: | WFI-XX-XX-XX |
| Valid From: | March 6, 2018 |
| Valid To: | December 31, 20XX |
| Issuer: | Signer-XXXX, XXX-XXX Inc |
| Serial Number | 64eb217003161afeb1bb468785b85bf2 |

| Thing Name | 64e6217323161efeb1bb468785b85bf2 |
|---|---|
| | SUBJECT KEY IDENTIFIER ( CERT ) |
| MN: | WFL-XXX |
| MD: | Monday, April 2, 2018 12:40:17 AM |
| SN: | XXXXXXXXXXXXXXXXXX |

SECURE PROVISIONING OF INTERNET OF THINGS DEVICES, INCLUDING ELECTRONIC LOCKS

CROSS-REFERENCE TO RELATED APPLICATIONS

The present application claims priority from U.S. Provisional Patent Application No. 62/662,070, filed on Apr. 24, 2018, the disclosure of which is hereby incorporated by reference in its entirety.

BACKGROUND

Certificates are traditionally generated as a pair of keys (public and private) and signed by a verifiable root of trust. For many Internet of Things devices, this process occurs in a secured server independently from the device that it will be installed into. Then, a managed process occurs during manufacturing whereby the public key is placed in the cloud, and the public and private key are placed in a non-volatile region of memory of the device. This relationship establishes that the device is authorized to connect to the remote server.

However, such an arrangement has drawbacks. Because such certificates are generated at a server and stored into non-volatile memory, the certificates are by definition stored in accessible memory of the Internet of Things device, and are formed using a generalized product certificate rather than a device-specific certificate. This introduces substantial vulnerability to the overall system, since a non-authorized device may be able to spoof the identity of a device by acquiring its certificate, and can then access and obtain settings or other data associated with the device. Still further, because the security certificate is formed at the product level (meaning, it identifies the product overall, rather than identifying and securing specific device components), the device is subject to modification or tampering and the certificate would remain valid.

Additionally, once a device record associated with a device is added to a cloud platform, that device record resides in a collection of available virtual devices awaiting user activation. A user is required to have a unique identifier that is available within the device or on a label that can be used to associate the user of the device with a representation of the device within the cloud storage. Existing internet of things devices tend to address this problem by providing a code on the device that can be captured by a mobile device and transmitted, alongside user credentials, to the cloud for registration of the device. This is often in the form of a bar code or QR code affixed to the device or its packaging, or a set of digits (e.g., and access code) that can be entered into an application. While this arrangement is convenient, it does allow the code to be captured by the mobile device, causing possible security compromise.

The above issues are particularly of concern with respect to devices for which security is of particular concern such as wireless or connected electronic locks and related devices.

SUMMARY

The present disclosure relates generally to methods of configuring a security device, such as an electronic lock, for use in a manner that ensures security of the lock as well as a lock-server communication arrangement. In particular, the present disclosure describes methods and systems for provisioning a lock with a certificate such that any change to the lock, or changes to lock-server communication characteristics, can be detected and (optionally) prevented. As such, security of such devices is improved.

In a first aspect, a method of configuring an electronic lock includes generating a public-private key pair at a cryptographic circuit included in the electronic lock, and transmitting a certificate signing request to a certificate signer, the certificate signing request including a plurality of attributes of the electronic lock. The method further includes receiving a signed certificate from the certificate signer, the signed certificate including cryptographic data reflecting the plurality of attributes in the certificate signing request, and configuring the signed certificate with a target server endpoint. The method further includes connecting the electronic lock to a server at the target server endpoint, and, after receiving acknowledgement from the server, storing in the cryptographic circuit the cryptographic data received from the certificate signer and the target server endpoint using a one-time write command.

In a second aspect, an electronic lock includes a processing unit, a locking bolt movable between a locked and unlocked position, and a motor actuatable by the processing unit to move the locking bolt between the locked and unlocked positions. The electronic lock further includes a wireless communication interface operatively connected to the processing unit, and a cryptographic circuit storing cryptographic information that is generated based on a plurality of attributes of the electronic lock and information identifying a target server endpoint. The electronic lock further includes a memory operatively connected to the processing unit and storing computer-executable instructions which, when executed by the processing unit, cause the processing unit to, upon initiating communication with a server identified by the information, transmitting, via the wireless communication interface, a certificate to the server that is generated based on the cryptographic information.

In a third aspect, a method of configuring a server account associated with an electronic lock is disclosed. The method includes receiving a secure connection request from an electronic lock, the secure connection request including a certificate generated by the electronic lock and including a plurality of attributes of the electronic lock. The method also includes, based on the server determining, from the certificate information, that the electronic lock is authorized to communicate with the server but has no corresponding server record: determining whether the electronic lock is an authorized electronic lock by comparing an identifier of the electronic lock received in the certificate to a permission list; establishing a virtual object and a policy at the server; associating the policy with the virtual device; associating the certificate with the policy; activating the certificate; and transmitting an acknowledgement of activation of the certificate to the electronic lock.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 7 illustrates an example device certificate generated at the electronic lock that is useable in the systems and methods described herein.

FIG. 12 is an example virtual device formed at the server during association of the electronic lock with a server record, in accordance with example aspects of the present disclosure.

DETAILED DESCRIPTION

Figure 1:
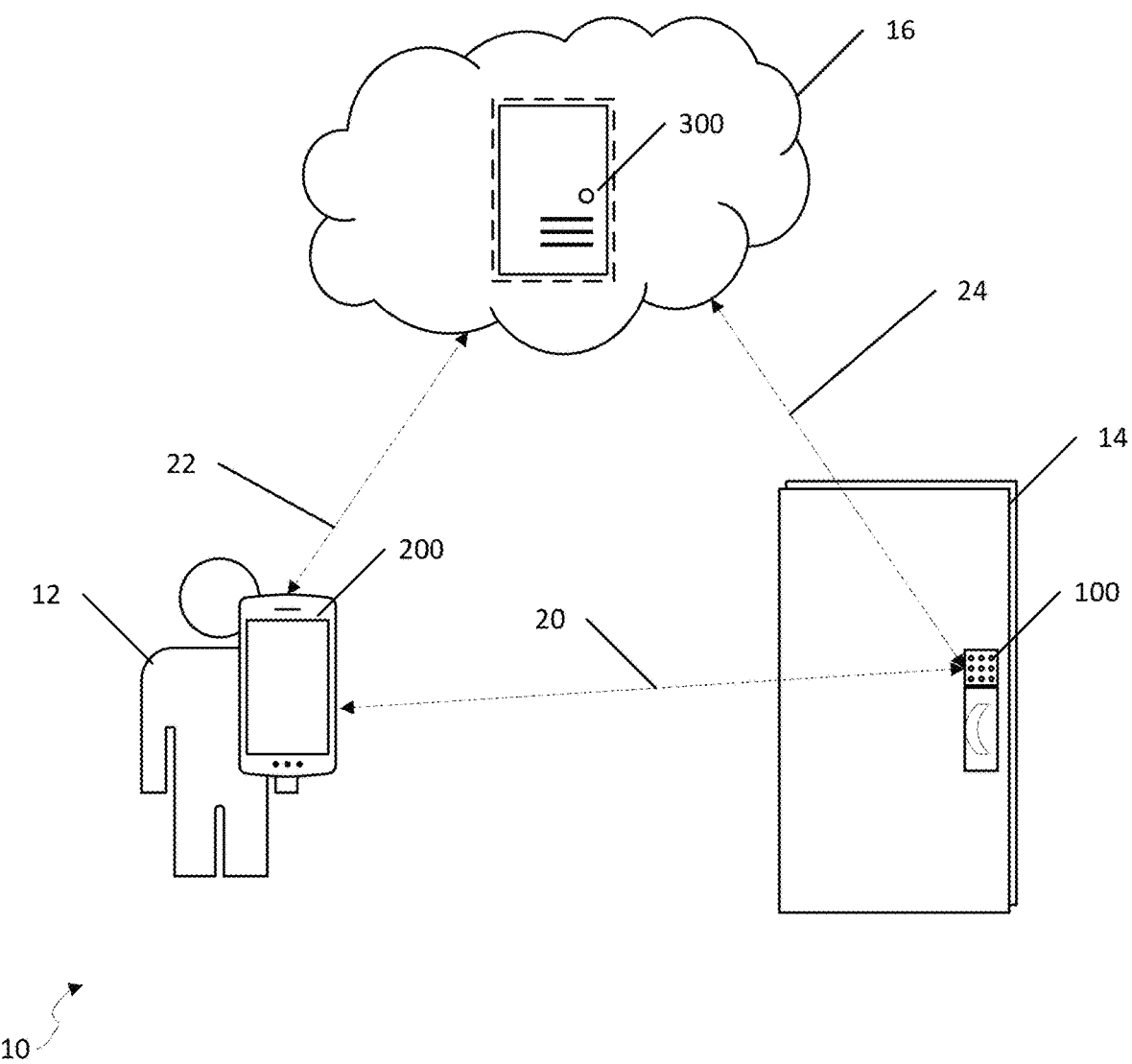
FIG. 1 illustrates an environment in which aspects of the present disclosure may be implemented.
Figure 2:
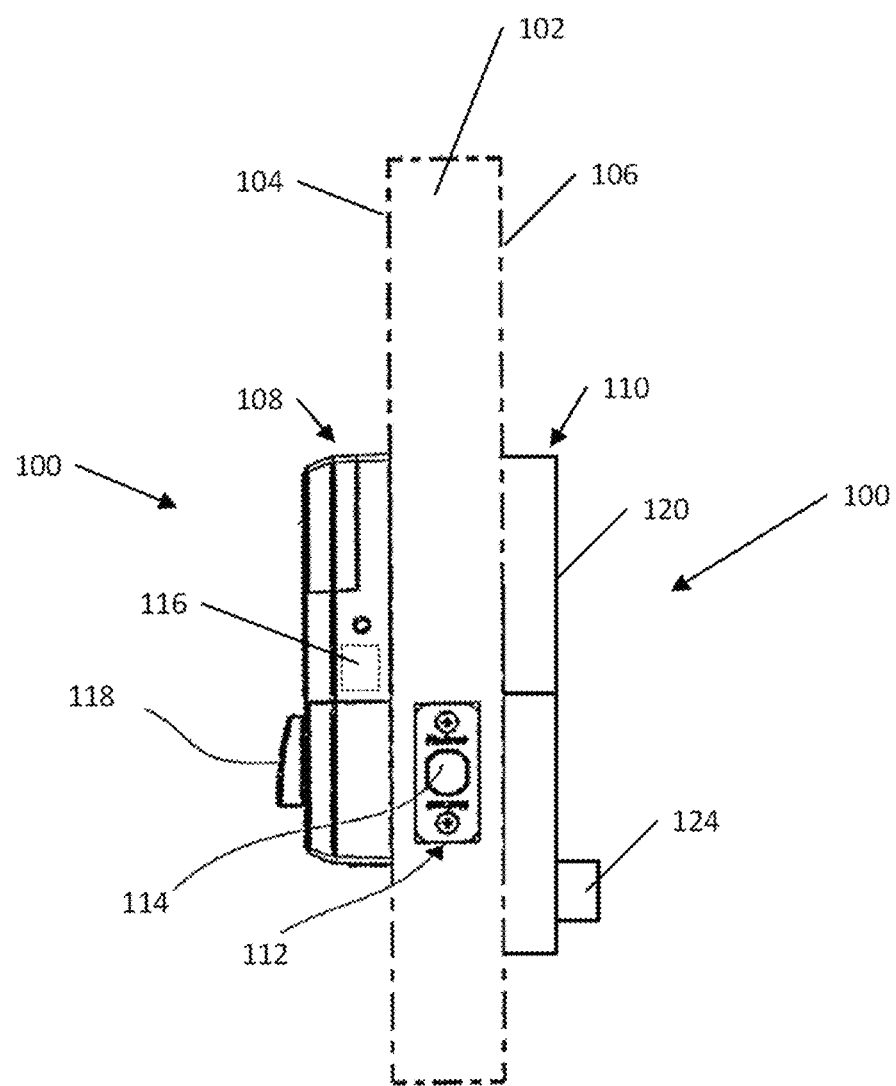
FIG. 2 illustrates a rear perspective view of a portion of the electronic lock of FIG. 1.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to secure provisioning of an internet of things device, such as a smart device. In example embodiments, the present disclosure relates to secure provisioning of a smart security device, such as an electronic lock. The provisioning methodology described herein ensures that the lock is not tampered with after provisioning, because a changed lock (or changed lock communication with a server) will generate a different certificate, and will not connect properly with a remote (e.g., cloud) server. By regenerating a certificate in the instance of each connection to the server, and by generating the certificate based on a broad selection of lock characteristics and connection characteristics for the connection between the lock and the server, any changes in those characteristics used in generating the certificate could prevent the electronic lock from subsequently generating a valid certificate.

In example aspects, various wireless protocols can be used. In example embodiments, a Wi-Fi protocol (802.11x) may be used to connect the electronic lock to a server (cloud) device, while a different wireless protocol (e.g., Bluetooth, including Bluetooth Low Energy, or BLE) used for short-range communication between the electronic lock and other devices, such as a mobile device used to actuate the lock. In other embodiments, various other wireless protocols can be used, such as other short- or long-range wireless protocols (e.g., cellular, RFID/NFC, Zigbee, Z-wave, etc.).

The term "lock" or "lockset" is broadly intended to include any type of lock, including but not limited to deadbolts, knob locks, lever handle locks, mortise locks and slide locks, whether mechanical, electrical or electro-mechanical locks. The locking points may have various mounting configurations and/or locations, including but not limited to: mortised within the doorframe, mounted externally to the doorframe or support structure, and/or affixed directly to the door.

In some instances, the lock or lockset can be included in an interconnected system that may have an unlimited number of locking points. In one embodiment, for example, a first lock may, either wired or wirelessly, communicate with a plurality of interconnected locks so that actuation of the first lock also actuates one or more of the other interconnected locks. For example, the plurality of interconnected locks may have a wired or wireless communication feature that allows communication between locks. By way of example only, a wired communication connection could include a short range differential or DC voltage signal, or could be implemented using a wired data protocol, such as IEEE 802.3 (Ethernet) data communication. Alternatively, wireless communication capability of the locks could use the Bluetooth wireless connection noted above, or in alternative embodiments, could also use the IEEE 802.11 standard, such as using Wi-Fi, or the IEEE 802.15.4 standard, such as using Zigbee, a cellular network, a wireless local area network, near-field communication protocol, or any other network protocols. Accordingly, the locks could communicate directly with a mobile device, or use a wireless gateway, and/or coordinate with other networking devices.

Although this disclosure describes these features as implemented on a deadbolt for purposes of example, these features are applicable to any type of lockset, including but not limited to deadbolts, knobset locks, handleset locks, etc. Still further, example aspects of the present application can be applied to other types of devices for which security is an issue, e.g., wireless/interconnected home devices that store user data.

FIG. 1 illustrates an environment 10 in which aspects of the present disclosure may be implemented. A user 12 has a phone or other mobile device 200 with wireless communication capabilities. The user 12 is an authorized person desiring to unlock (or lock) a door 14. The door 14 includes an electronic lock 100 (also referred to as a wireless electronic lockset). The mobile device 200 is capable of communicating 22 with a server 300 and communicating 20 with the electronic lock 100. The server 300 can be, for example a physical server, or a virtual server hosted in a cloud storage environment 16. The electronic lock 100 is also capable of communicating 24 with the server 300. Such communication can optionally occur via one or more wireless communication protocols, e.g., Wi-Fi (IEEE 802.11), short-range wireless communication to a Wi-Fi bridge, or other connection mechanism. The server 300 generally validates a certificate received from the electronic lock 100 when a user of a mobile device 200 attempts to unlock the door 14.

I. Electronic Lock Components and In-Use Operation

FIGS. 2-5 illustrate an electronic lock 100 as installed at a door 102, according to one example of the present disclosure. The door has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 102 is in an unlocked state. When the bolt 114 is extended, the bolt 114 protrudes from the door 102 into a door jamb (not shown) to place the door in a locked state.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. The term "outside" is broadly used to mean an area outside the door 102 and "inside" is also broadly used to denote an area inside the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

Figure 3:
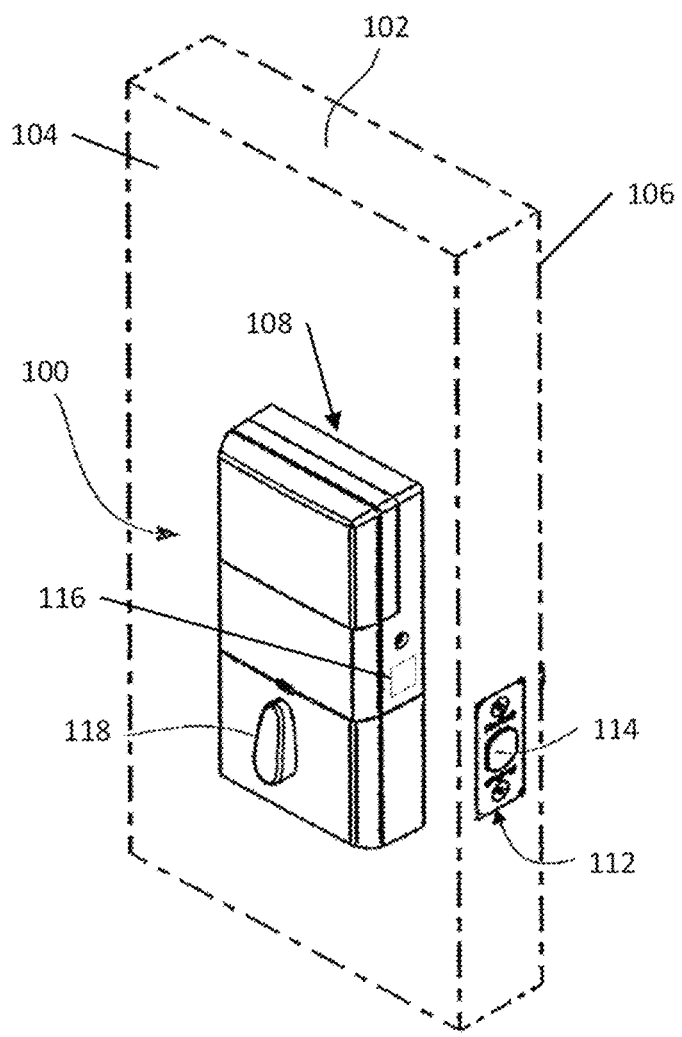
FIG. 3 illustrates a front perspective view of a portion of the electronic lock of FIG. 1.

Referring to FIG. 3, the interior assembly 108 can include a processing unit 116 (shown schematically) containing electronic circuitry for the electronic lock 100. In some examples, the interior assembly 108 includes a manual turnpiece 118 that can be used on the interior side 104 of door 102 to move the bolt 114 between the extended and retracted positions.

The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device and may be embodied as a standalone unit or as a device shared with components of the electronic lock 100. The processing unit 116 may include memory communicatively interfaced to the processor, for storing the software instructions. Alternatively, or the electronic lock 100 may further comprise a separate memory device for storing the software instructions that is electrically connected to the processing unit 116 for the bi-directional communication of the instructions, data, and signals therebetween.

Figure 4:
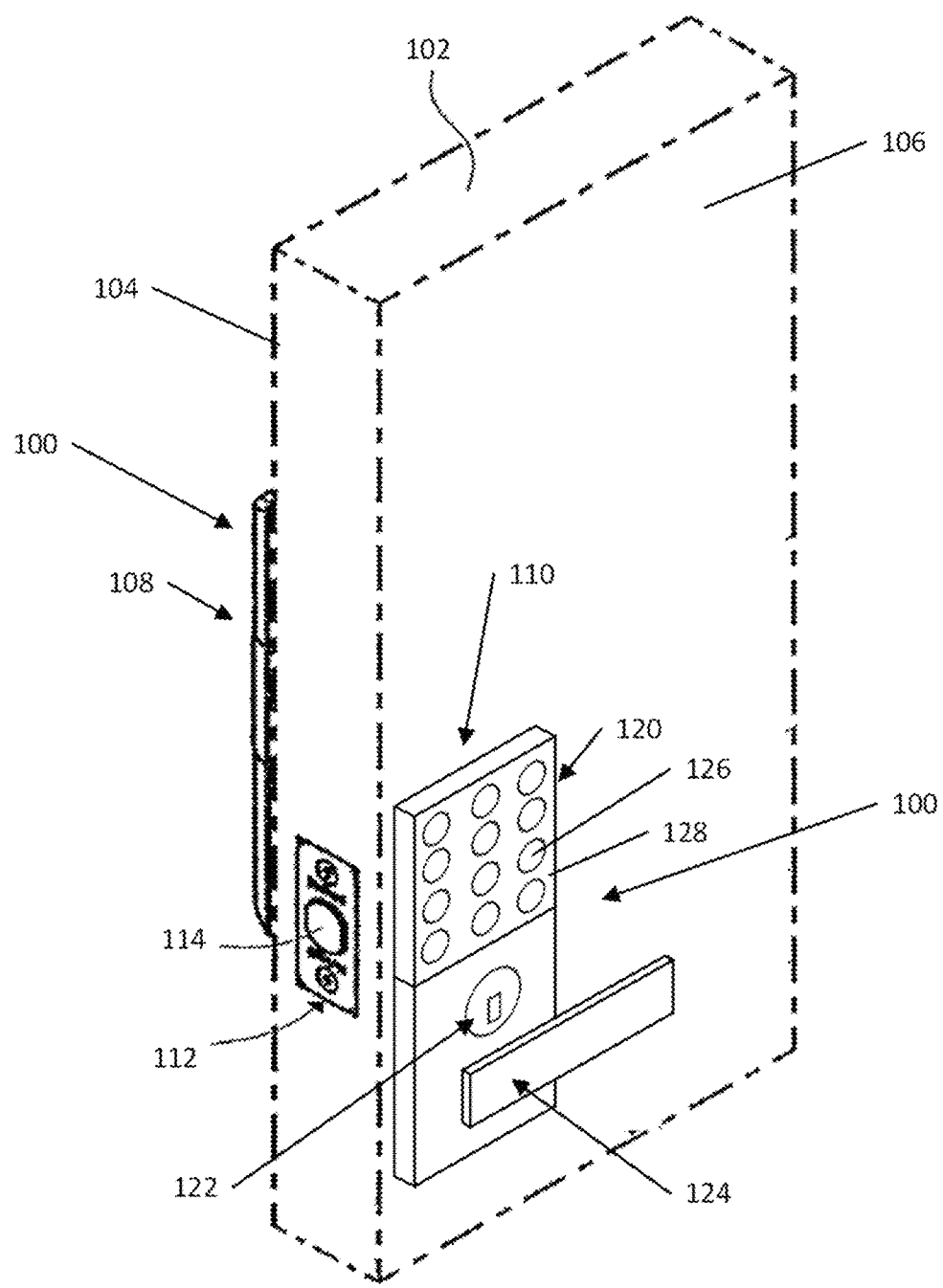
FIG. 4 illustrates a schematic representation of an example system utilizing the electronic lock of FIG. 1.

Referring to FIG. 4, the exterior assembly 110 can include exterior circuitry communicatively and electrically connected to the processing unit 116. For example, the exterior assembly 110 can include a keypad 120 for receiving a user input and/or a keyway 122 for receiving a key (not shown). The exterior side 106 of the door 102 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid code into the keypad 120, the bolt 114 is moved between the extended and retracted positions.

In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 102. When the user inputs a valid code via keypad 120 that is recognized by the processing unit 116, an electrical motor is energized to retract the bolt 114 of latch assembly 112, thus permitting door 102 to be opened from a closed position. Still further, an electrical connection between the exterior assembly 110 and the interior assembly 108 allows the processing unit 116 to communicate with other features included in the exterior assembly 110, as noted below The keypad 120 can be any of a variety of different types of keypads. The keypad 120 can be one of a numeric keypad, an alpha keypad, and/or an alphanumeric keypad. The keypad 120 can have a plurality of characters 126 displayed thereon. For example, the keypad 120 can include a plurality of buttons that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In alternative embodiments, one or more other types of user interface devices could be incorporated into the electronic lock 100. For example, in example implementations, the exterior assembly 110 can include a biometric interface (e.g., a fingerprint sensor, retina scanner, camera including facial recognition), or an audio interface by which voice recognition could be used to actuate the lock. Still further, other touch interfaces may be implemented, e.g., where a single touch may be used to actuate the lock rather than requiring entry of a specified code.

Figure 5:
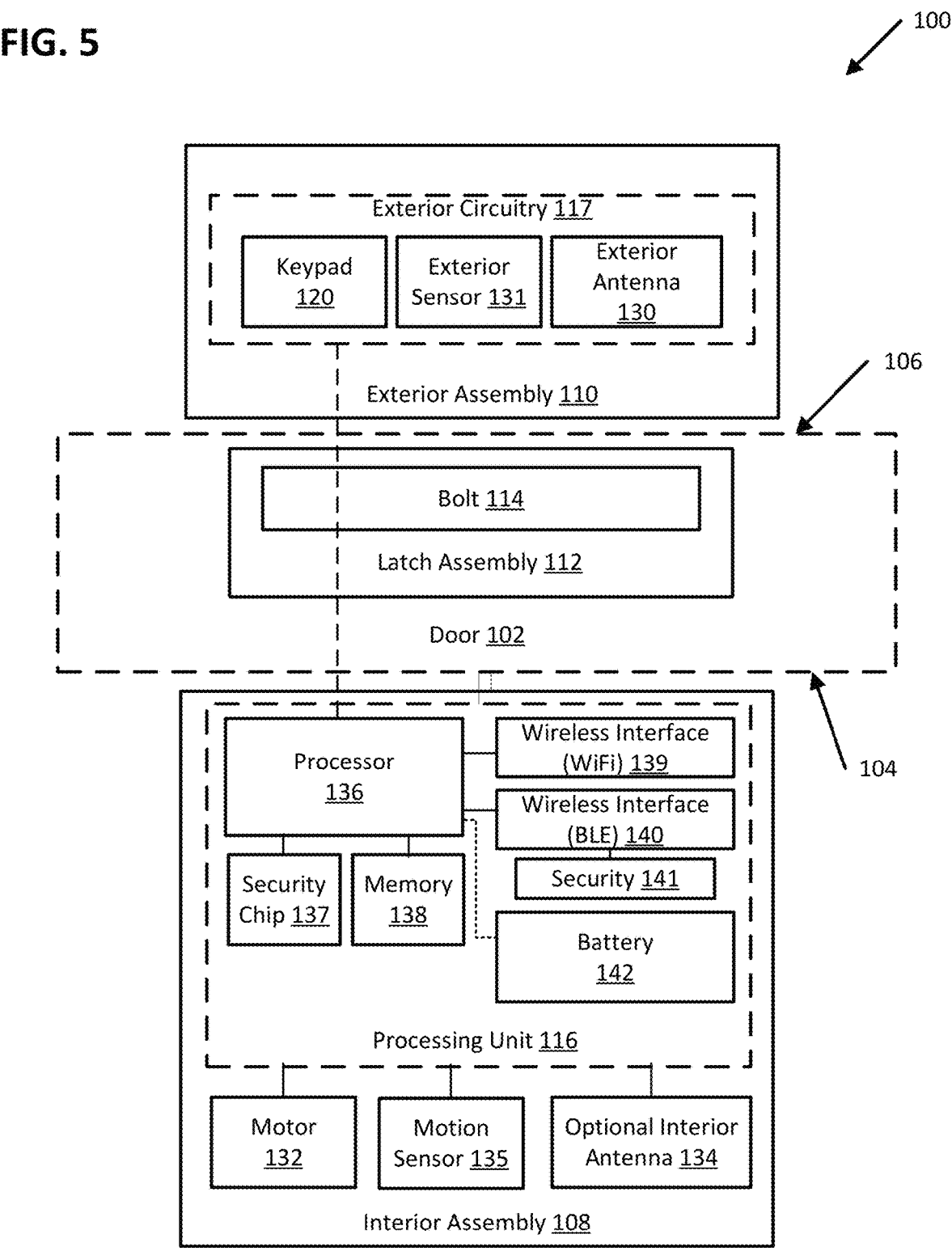
FIG. 5 illustrates a schematic representation of the electronic lock of FIG. 1.

FIG. 5 is a schematic representation of the electronic lock 100 mounted to the door 102. The interior assembly 108, the exterior assembly 110, and the latch assembly 112 are shown.

The exterior assembly 110 is shown to include the keypad 120 and an optional exterior antenna 130 usable for communication with a remote device. In addition, the exterior assembly 110 can include one or more sensors 131, such as a camera, proximity sensor, or other mechanism by which conditions exterior to the door 102 can be sensed. In response to such sensed conditions, notifications may be send by the electronic lock 100 to a server 300 or mobile device 200, including information associated with the sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device 200 determined to be located on the exterior of the door is able to actuate (unlock or lock) the door. This prevents unauthorized users from being located exterior to the door 102 of the electronic lock and taking advantage of an authorized mobile device that may be located on the interior of the door, even though that authorized mobile device is not being used to actuate the door. However, such a feature is not required, but can add additional security. In alternative arrangements, the electronic lock 100 is only actuable from either the keypad 120 (via entry of a valid code) or from an application installed on the mobile device 200. In such arrangements, because touch alone at the exterior of the door cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and Bluetooth interface 140), and a battery 142. The processing unit 116 is located within the interior assembly 108 and is capable of operating the electronic lock 100, e.g., by actuating a motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138. In certain embodiments, the processing unit 116 can include a plurality of processors 136, including one or more general purpose or specific purposes instruction processors. In some examples, the processing unit 116 is configured to capture a keypad input event from a user and store the keypad input event in the memory 138. In other examples, the processor 136 receives a signal from the exterior antenna 130, interior antenna 134, or motion sensor 135 (e.g., a vibration sensor, gyroscope, accelerometer, motion/position sensor, or combination thereof) and can validate received signals in order to actuate the lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of processor 136. The security chip 137 can, for example, generate and store cryptographic information useable to generate a certificate useable to validate the electronic lock 100 with a remote system, such as the server 300 or mobile device 200. In certain embodiments, the security chip 137 includes a one-time write function in which a portion of memory of the security chip 137 can be written only once, and then locked. Such memory can be used, for example, to store cryptographic information derived from characteristics of the electronic lock 100, or its communication channels with server 300 or one or more mobile devices 200. Accordingly, once written, such cryptographic information can be used in a certificate generation process which ensures that, if any of the characteristics reflected in the cryptographic information are changed, the certificate that is generated by the device 137 would become invalid, and thereby render the electronic lock 100 unable to perform various functions, such as communicate with the server 300 or mobile device 200, or operate at all, in some cases. Additionally, in some embodiments, the device 137 includes secure storage, and is configured to securely store a signed certificate that is generated during a provisioning process may be included. Details regarding configuration of an electronic lock 100 to include security features, including provisioning the electronic lock with cryptographic data tying the electronic lock to a specific server location, are provided below.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and Bluetooth interface 140. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with one or both of the mobile device 200 and server 300 the Wi-Fi interface, and can communicate with the mobile device 200 when the mobile device is in proximity to the electronic lock 100 via the Bluetooth interface 140. In some embodiments, the processing unit 116 is configured to communicate with the mobile device 200 via the Bluetooth interface 140, and communications between the mobile device 200 and electronic lock 100 when the mobile device 200 is out of range of Bluetooth wireless signals can be relayed via the server 300, e.g., via the Wi-Fi interface 139.

Of course, in alternative embodiments, other wireless protocols could be implemented as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device 200, for communication of an intent to actuate the electronic lock 100. As illustrated in further detail below, the processor 136 can also initiate communication with the server 300 via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server 300; as such, a user of a mobile device 200 may access an account associated with the electronic lock 100 to view and modify settings of that lock, which are then propagated from the server 300 to the electronic lock 100. In alternative embodiments, other types of wireless interfaces can be used; generally, the wireless interface used for communication with a mobile device can operate using a different wireless protocol than a wireless interface used for communication with the server 300.

In a particular example, the Bluetooth interface 140 comprises a Bluetooth Low Energy (BLE) interface. Additionally, in some embodiments, the Bluetooth interface 140 is associated with a security chip 141, for example a cryptographic circuit capable of storing cryptographic information and generating encryption keys useable to generate certificates for communication with other systems, e.g., mobile device 200.

The interior assembly 108 also includes the battery 142 to power the electronic lock 100. In one example, the battery 142 may be a standard single-use (disposable) battery. Alternatively, the battery 142 may be rechargeable. In still further embodiments, the battery 142 is optional altogether, replaced by an alternative power source (e.g., an AC power connection).

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 102 is locked and the motor 132 receives a lock command, then no action is taken. If the door 102 is locked and the motor 132 receives an unlock command, then the motor 132 actuates the bolt 114 to unlock the door 102.

As noted above, the optional interior antenna 134 may also be located in the interior assembly 108. In some examples, the interior antenna 134 is capable of operating together with the exterior antenna 130 to determine the location of the mobile device 208. In some examples, only a mobile device determined to be located on the exterior side 110 of the door 102 is able to unlock (or lock) the door 102. This prevents unauthorized users from being located near the electronic lock 100 and taking advantage of an authorized mobile device that may be located on the interior side 108 of the door 102, even though the authorized mobile device is not being used to unlock the door 102.

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

In still further example embodiments, the electronic lock 100 can include integrated motion sensor 135. Using such a motion sensor (e.g., an accelerometer, gyroscope, or other position or motion sensor) and wireless capabilities of a mobile device or an electronic device (i.e. fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200 in proximity to the electronic lock 100.

Of course, in alternative embodiments, other lock actuation sequences may not require use of a motion sensor 135. For example, if the mobile device 200 is in valid range of the electronic lock 100 when using a particular wireless protocol (e.g., Bluetooth Low Energy), then a connection will be established with the electronic lock 100. Other arrangements are possible as well, using other connection sequences and/or communication protocols.

II. Electronic Lock Provisioning

Referring now to FIGS. 6-13, methods and systems for provisioning an electronic lock are disclosed. The methods and systems described herein provide a secure method of ensuring that an electronic lock is not tampered with, and that it maintains a trusted connection to a server. In some embodiments, settings adjusted at the server can be propagated to the electronic lock in a trusted manner, with any tampering or unauthorized changes resulting in a corrupted certificate being exchanged between the lock and server, thereby invalidating the lock and preventing server actuation of the lock.

Figure 6A:
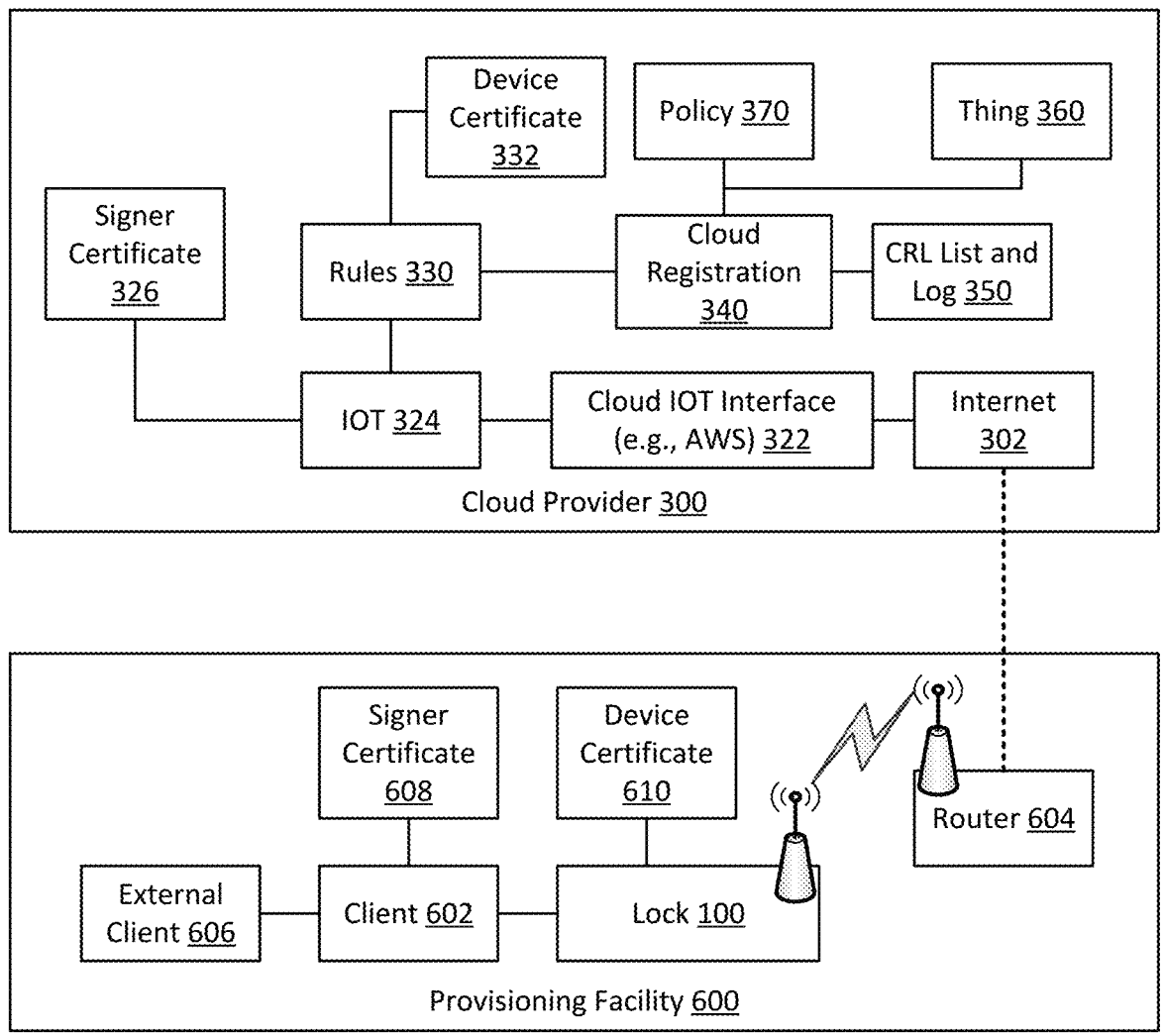
FIG. 6A illustrates an example system in which a device, such as an electronic lock, can be provisioned, according to an example embodiment of the present disclosure.

FIG. 6A illustrates an example system in which a device, such as an electronic lock 100, can be provisioned, according to an example embodiment of the present disclosure. In the example shown, the electronic lock 100 is positioned at a provisioning facility 600 that is communicatively connected to a server 300, such as a cloud server. The provisioning facility 600 can be, for example, a facility of a manufacturer of the electronic lock 100.

In the embodiment shown, an electronic lock 100 to be provisioned is communicatively connected to a client 602 and a router 604. Optionally, a further external client 606 can be provided, for example to act as a root signature generation device for purposes of signing certificates associated with the electronic lock or other devices provisioned at the facility 600. Accordingly, client 602 can store a signer certificate 608, which can be an intermediate certificate, for signing certificates in response to a certificate signing request received from a device such as the electronic lock. In the embodiment shown, the electronic lock 100 generates a certificate 610 and sends the certificate to the client 602 for signing with an intermediate certificate; the device's signed certificate can then be returned to the electronic lock 100.

The electronic lock 100 can communicate with the server 300 via router 604, which routes requests to the server. In the embodiment shown, the server 300 corresponds to a cloud server having an internet interface 320, a cloud IOT interface 322, and an IOT registry 324, which stores a further signer certificate 326. The cloud signer certificate 326 can be used in the methods discussed below to sign the device certificate 310 such that the device certificate is tied to each of the manufacturer, various characteristics of the electronic lock, and the server, forming an immutable trust relationship among those entities.

Additionally, at the server 300, a rules engine 330 determines whether received connection requests are related to devices that were previously registered (in which case, they can be validated against a public key version of the device certificate 332 stored in the server 300), or whether the device is not registered and therefore should be registered. A cloud registration engine 340 receives such registration requests, and assesses against a certificate restriction list 350 (e.g., implemented as either a whitelist of allowed devices or a blacklist of prohibited devices). The cloud registration engine 340 can generate a plurality of cloud objects for a device, including a virtual device 360 and a policy 370, to which the server version of the device certificate 332 can be attached. Successfully registered devices can then be sent an acknowledgement as well as the updated (server-signed) device certificate, and results of registration of the device logged in the certificate restriction list 350. Additional details regarding such engines, and their interoperation are described below in conjunction with FIGS. 8-11.

Figure 6B:
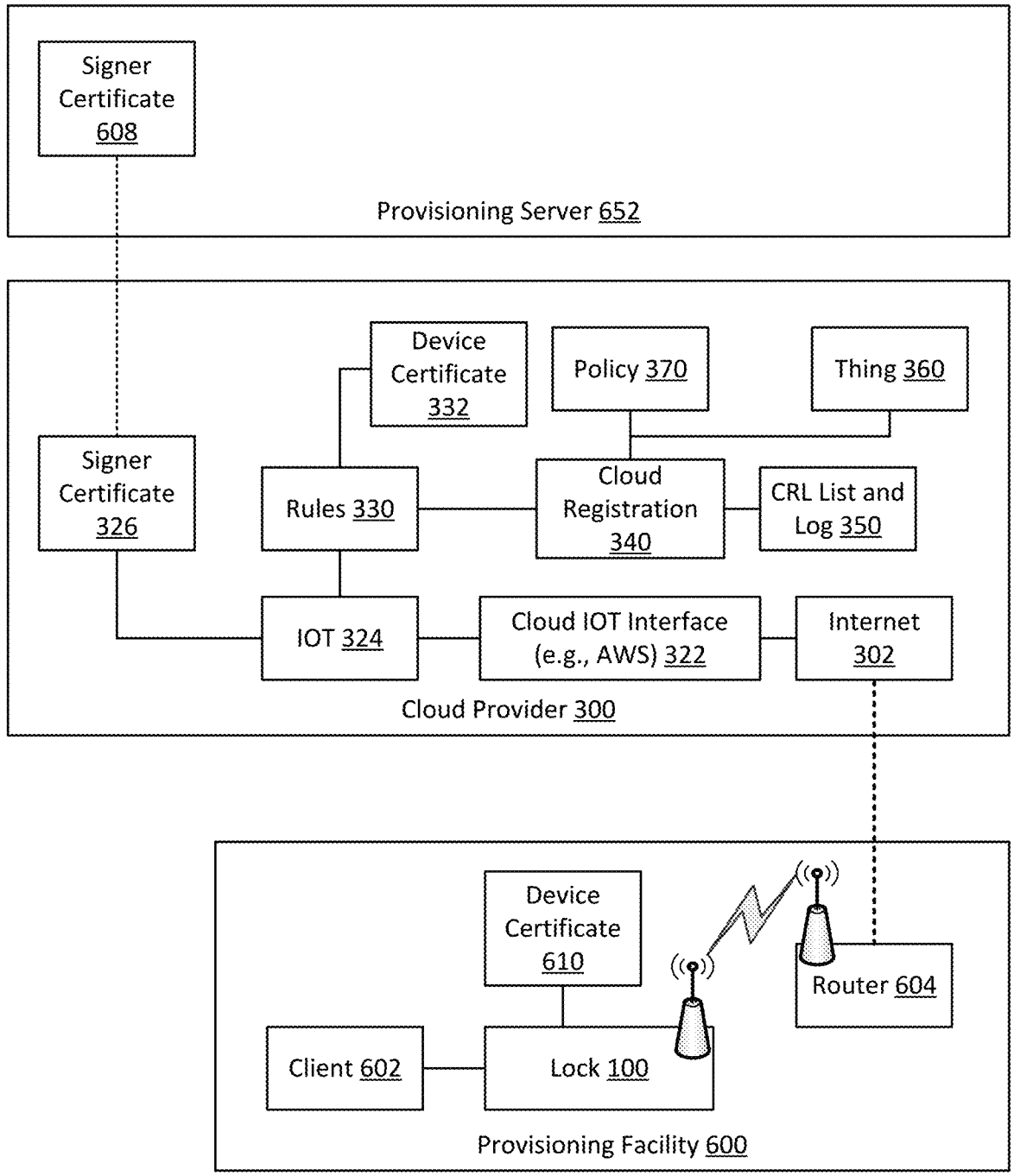
FIG. 6B illustrates an example system in which a device, such as an electronic lock, can be provisioned, according to a second example embodiment of the present disclosure.

In an alternative embodiment to the one seen in FIG. 6A, in FIG. 6B a remote or cloud-based certificate signer is used. In this embodiment, the lock 100 or client 602 may be programmed to include instructions for forming a trusted connection to a cloud environment via router 604, e.g., to provisioning server 652. In this arrangement, the provisioning server 652 may receive the lock certificate that is generated based on the lock characteristics (e.g., as generated by a security chip of the lock). In this arrangement, the provisioning server 652 will receive the lock certificate, sign the certificate, and return a signed certificate. That signed certificate can then be stored in secure storage of the lock, e.g., for retrieval and use in subsequent communication with the cloud provider 300, which will store a corresponding signed device certificate. In such an arrangement, although the lock will not regenerate the certificate during each communication sequence with the cloud provider 300, it maintains security by storing the signed certificate in a separate, secure storage within the lock 100 (as noted above in connection with FIG. 5).

In use, the client 602 may issue a provisioning command to the cloud provisioning server 652, which can form a trusted connection to the lock 100. For example, the device may store firmware to generate device communication keys that can be used for trusted communication with the device, and transmit a public key to the provisioning server 652. Once trusted communication is established, the provisioning server 652 can read a root certificate file, signer key file, and signer certificate file, as well as determine a server endpoint address (e.g., to determine a cloud server to associate with the lock). The provisioning server 652 will then transmit a device certificate to the lock 100. In response, the lock 100 will generate or transmit device certificate 610 to the provisioning server via the trusted connection. The provisioning server 652 can then sign the device certificate 610 and save the signed device certificate, forwarding both a signer certificate and signed device certificate to the lock 100. Once the lock 100 has the signer certificate, root certificate, and signed device certificate, and an identity of an IoT endpoint (e.g., server 300), the lock may terminate connection with the provisioning server 652 and initiate communication with the server 300 to form cloud objects as noted below.

Referring now to FIG. 7, an example fully-provisioned device certificate 612 generated at the electronic lock is shown. The device certificate as illustrated includes a certificate name, a common name (e.g., a shortened version of the certificate name), an organization to which the certificate belongs, valid dates (e.g., a valid start and end date), an issuer (identifying the provisioning entity) and a serial number of the device to which the certificate is associated. Additional information can be reflected in cryptographic information associated with the certificate, such as the target server to which the certificate authorizes connection, device characteristics of the electronic lock, or other features.

Figure 8:
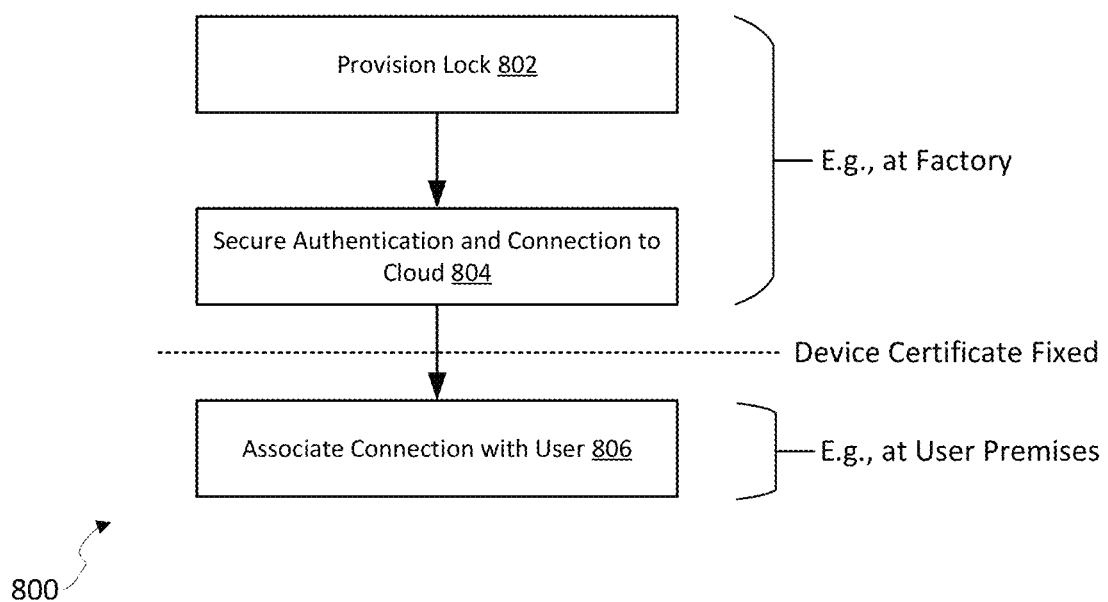
FIG. 8 is an example generalized method of configuring an electronic lock, in accordance with example aspects of the present disclosure.

Now referring to FIGS. 8-11, methods of configuring an electronic lock are described. FIG. 8 is an example generalized method 800 of configuring an electronic lock, in accordance with example aspects of the present disclosure. Generally, at 802, the electronic lock 100 is provisioned at a factory, or otherwise provisioned at a time of manufacture (before being provided to an end-user). At 804, the electronic lock is then authenticated and connected to a cloud server for completed association of the lock with the server in a trusted manner. Once this connection and association is completed, and relevant certificates are exchanged and signed, the device certificate can be "hardened" into the electronic lock, thereby fixing the device and its association with the server. At this point, the electronic lock is ready to be provided to a user. At 806, the electronic lock can be associated with a user, e.g., once the lock is installed at a user premises.

Figure 9:
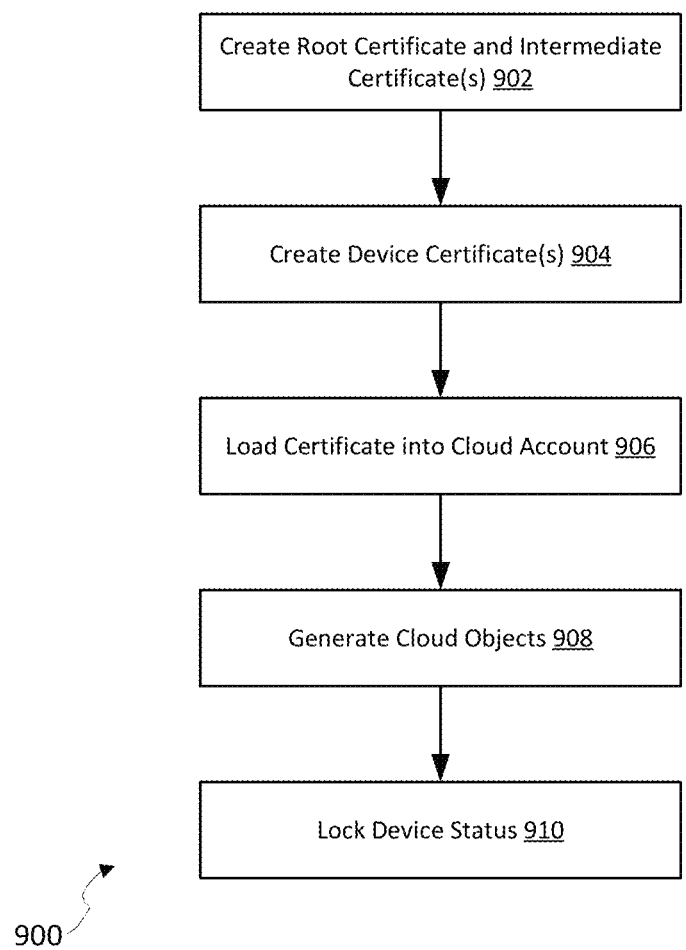
FIG. 9 is an example method of provisioning a lock at a facility in association with a server (e.g., cloud) connection, in accordance with example aspects of the present disclosure.

FIG. 9 is an example method 900 of provisioning a lock in association with a server (e.g., cloud) connection, in accordance with example aspects of the present disclosure. The method 900 accomplishes portions of steps 802-804 of FIG. 8.

At 902, a root certificate and intermediate certificates are created by a manufacturer of the electronic lock. In some embodiments, the root certificate will be generated and stored in a secure facility with support documentations for generating subsequent intermediate certificates. Additionally, at least one of the intermediate certificates (any intermediate certificate to be used for signing the device certificate of the lock) is registered at the server. In alternative embodiments, the root certificate and signer certificate are stored at a cloud provisioning server, such as server 652 of FIG. 6B.

At 904, the device certificate is formed at the electronic lock. In an example embodiment, the device certificate will be generated using a custom firmware in the factory that will reside within the electronic lock 100.

In an example embodiment, such as would occur in the arrangement of FIG. 6A, described above, an external client (e.g., client 602) will issue the command to configure a crypto-authentication device (e.g., security chip 137 of FIG. 5). Once the electronic lock 100 has been configured, the client 602 will issue the "generate private keys" command and a component included within the electronic lock (e.g., security chip 137) will generate public and private keys to be used in generating a certificate. The processing unit can request a "To Be Signed" (TBS) hash, and the security circuit 137 will generate the hash. A serial number from the security circuit 137 can be hashed with a serial number of a processor included in the processing unit 116 (e.g., an instance of the processor 136) to generate the certificate. This creates an immutable relationship between the two devices that cannot be altered without corrupting the immutable properties of the certificate.

The processing unit 116 will construct a certificate signing request that includes in metadata the hash generated above. The processing unit 116 will request the client 602 to sign the certificate signing request with the signing certificate 610, and the client 602 will return the device certificate 612 back to the processing unit 116 of the electronic lock 100. The processing unit 116 will send the cryptographic portion of the signed device certificate to the security chip 137.

In a further example embodiment, such as would occur in the arrangement of FIG. 6B, the client 602 similarly issues a provisioning command, but does so by communicating with a provisioning server, such as a cloud provisioning server 652. The provisioning server can then send a request to the lock 100 which results in triggering of the component included within the electronic lock (e.g., security chip 137) for generating public/private keys used in generating a certificate. Once a response is received at the provisioning server from the lock 100, the provisioning server can confirm with the client 602 that provisioning has begun. The provisioning server can then send a WiFi configuration command to the lock, which causes the device 137 137 to set WiFi parameters for the lock. Upon successful WiFi configuration, the provisioning server will read the root certificate file, signer key file, signer certificate file, and a desired cloud endpoint address of a server (e.g., server 300) to which the device is to be assigned for cloud connection. The provisioning server can then send a device certificate signing request notification to the lock, which generate a certificate signing request to be returned to the provisioning server. The provisioning server then generates a device certificate, signs the device certificate, and saves the device certificate, forwarding the signed device certificate to the device for secure storage (e.g., within device 137). The lock can confirm to the provisioning server successful receipt of the signed certificate.

At 906, the now-signed certificate 612 is used to initiate communication with server 300 to associate the electronic lock 100 with an account at the server 300. This involves an attempted connection process as illustrated in FIG. 10.

Figure 11:
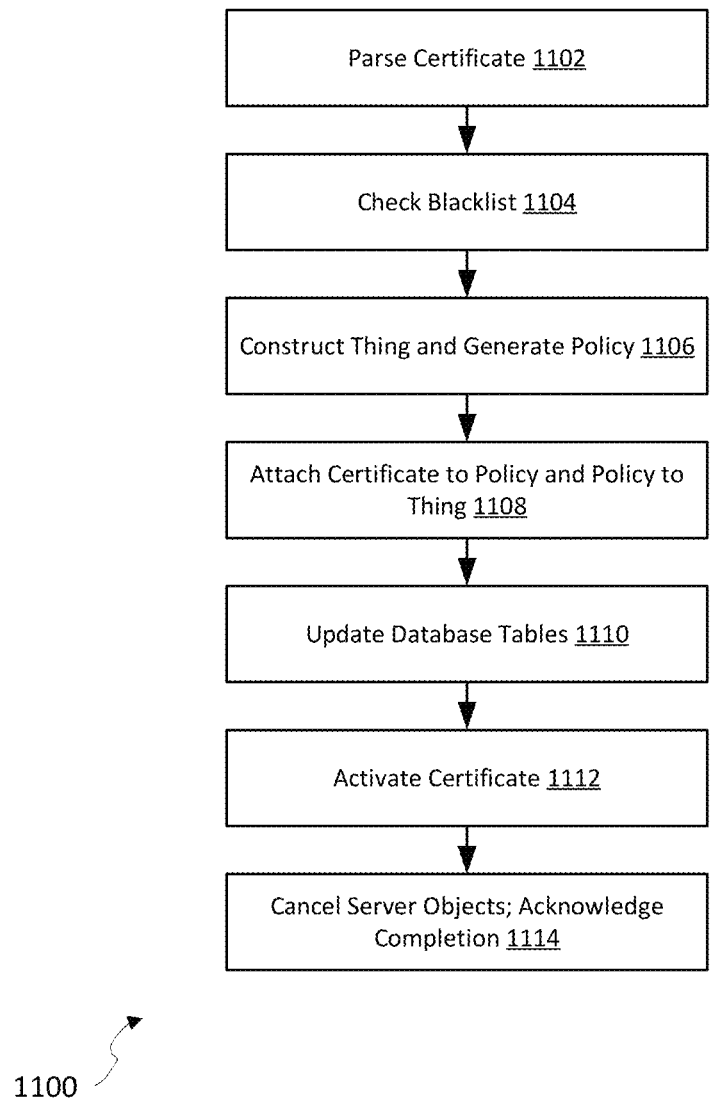
FIG. 11 is an example method performed by a server (e.g., cloud server) to associate an electronic lock with a server record, in accordance with example aspects of the present disclosure.

At 908, the server 300 can generate a plurality of cloud objects. In example embodiments, the server will perform a method as illustrated in FIG. 11. Upon completion of creation of the cloud objects and confirmation with the electronic lock, the electronic lock can disconnect from the server 300 and attempt to connect again successfully; if such a connection is successful, at 910, the electronic lock may have its status locked by writing the cryptographic portion of the device certificate to the security circuit 137 using a one-time write command. At this point, the cryptographic portion of the device certificate is signed by the manufacturer and server (e.g., cloud) location, and is originally generated based on device characteristics. Accordingly, the one-time write command affixes that relationship among the device characteristics, the manufacturer, and the cloud, forming the immutable relationship noted above among those entities/devices.

Figure 10:
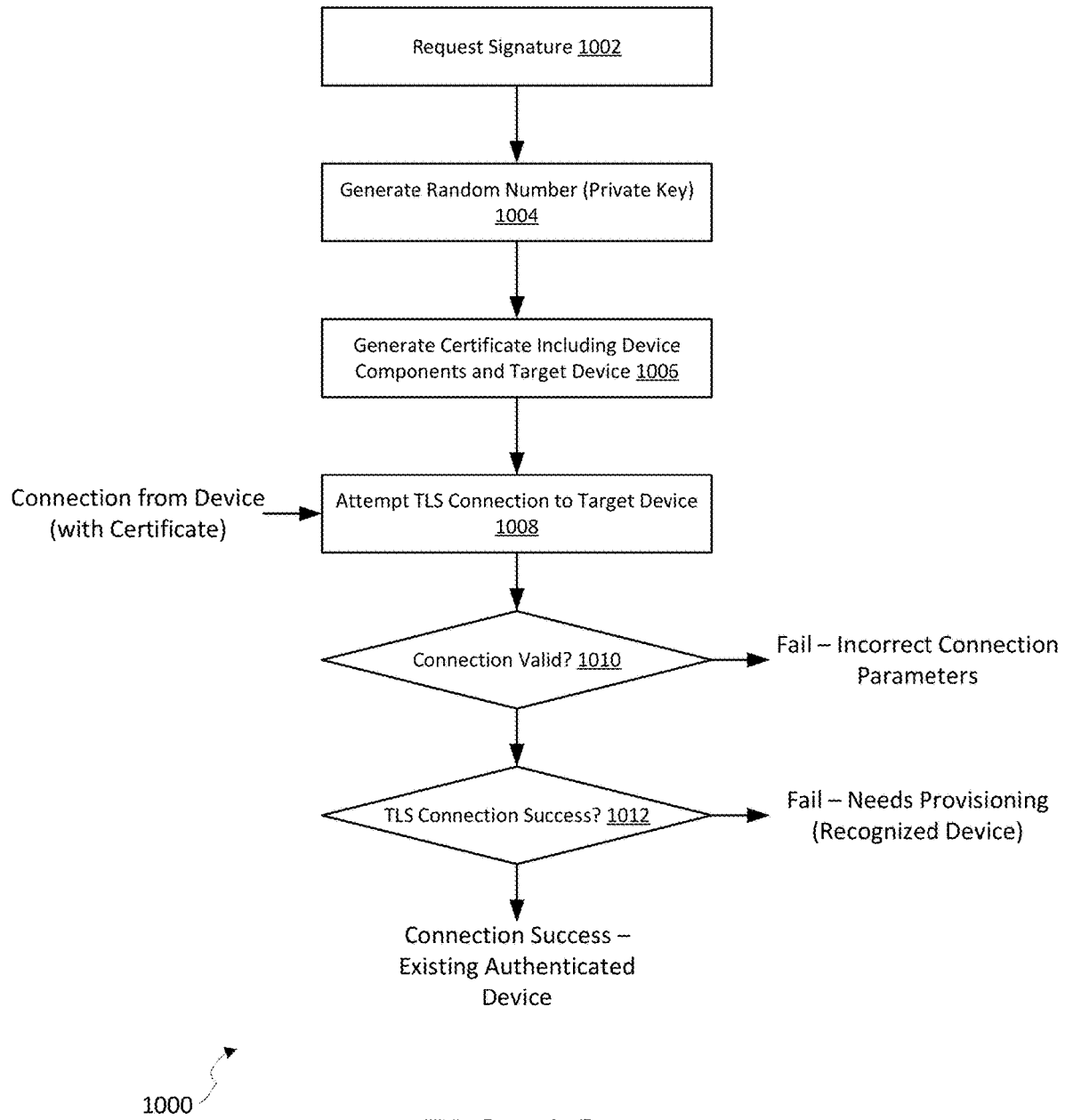
FIG. 10 is an example method performed by an electronic lock within the provisioning process of FIGS. 8-9.

FIG. 10 is an example method performed by an electronic lock 100 within the provisioning process of FIGS. 8-9. Generally, the method 1000 corresponds to operations performed by the electronic lock during at least a portion of the provisioning process for that electronic lock.

At 1002, the electronic lock requests a signature from a client device, which obtains and signs the device certificate using a trusted certificate of the provisioning entity (e.g., manufacturer). The trusted certificate can be, for example, a root certificate or an intermediate certificate signed/created by the root certificate.

At 1004, the electronic lock generates a random number to be used as the private key used in its device signature. The random number is maintained within the security chip 137 of the electronic lock, with only a public key version being exposed externally, e.g., for signature by the trusted certificate of the provisioning entity.

At 1006, the device certificate is formed, and includes information associated with the device as well as a target device (e.g., the cloud server) to which the device is intended to connect, forming a trusted connection. In some embodiments, rather than being formed (or recreated), the device certificate can be simply retrieved from memory of the device 137; this has the advantage of convenience and potential power savings, and can be performed in combination with the cloud provisioning server of FIG. 6B, but would not provide the added security of regeneration of the device certificate during each communication sequence with the server 300.

At 1008, a connection to the target device is attempted using the information defining to the electronic lock connection parameters associated with the server. The process provides a mechanism to allow a device with a certificate that was signed with a certificate that was registered with the server account to trigger an event that can register that device certificate with that target server account. The provisioning process will initiate this process by providing the electronic lock with a connection via router 604 which will be used to initiate connection to the server 300, and a particular valid account at the server.

Because, the attempted connection to the server by the electronic lock 100 includes a certificate that is signed by the provisioning entity (either a local provisioning or cloud based provisioning in FIGS. 6A-6B), at 1010, the connection will be determined to be valid; however, because no account exists for the electronic lock (because the IoT registry 324 only authorizes connection to devices having active certificates (rather than "pending activation" certificates, such as the electronic lock before cloud objects are created), at 1012, a connection to the server will ultimately fail.

It is noted that if wrong connection parameters are used entirely (e.g., an invalid certificate), at 1010, the connection will fail immediately. Furthermore, if the certificate for the lock 100 is active and the certificate is also valid, at 1012, the connection will succeed (corresponding to typical post-provisioning communication between the electronic lock 100 and the server 300).

FIG. 11 is an example method 1100 performed by a server 300 (e.g., cloud server) to associate an electronic lock with a server record, in accordance with example aspects of the present disclosure. In other words, the example method 1100 generally forms a virtual lock at the server that can be accessed remotely by, e.g., the mobile device 200, for modifying lock settings, transmitting remote actuation commands to the lock, or performing various other functions. The method 1100 can be initiated upon determining, at 1012, that no account information associated with the particular electronic lock exists, but that the lock is in a "pending activation" state. The pending activation state may be due to the server recognizing that, in the received certificate, although the certificate is not a recognized currently active certificate, it is from a trusted supplier (based on the issuer information in certificate 612). At 1102, the server 300 receives and parses a certificate received from the electronic lock 100. The parsing can determine, for example, that the certificate is a certificate that was issued from a provisioning entity that is authorized to create a virtual device on the server. A rules engine can be triggered by a message issued by the IoT module of the server 300 to generate server objects used to form the virtual lock.

At 1104, a list of restricted electronic locks is assessed to determine whether the lock should be allowed to have a corresponding virtual lock created.

At 1106, a virtual device and a policy are created that will be used to define the virtual lock. In an example embodiment, the virtual device can be as illustrated in FIG. 12, below. The policy generally defines permissions available to the process creating the server objects.

At 1108, the received device certificate is attached to the policy and the policy is attached to the virtual device. At 1110, database tables are updated to add records of the thing, policy, and certificate, thereby establishing a virtual lock record at the server 300. Accordingly, at 1112, the certificate is set to active status from "pending registration".

At 1114, server objects are canceled and completion of the registration process is acknowledged by registering the provisioning event in the server database and transmitting an acknowledgement of completion to the electronic lock 100 prior to terminating the connection between the server 300 and the electronic lock 100.

FIG. 12 is an example virtual device 1200 formed at the server during association of the electronic lock with a server record, in accordance with example aspects of the present disclosure. As illustrated, the virtual device includes a subject key identifier to identify the public key useable to validate the device certificate contents. The virtual device also stores a serial number, model number, and manufacturing date of the corresponding "thing" (in this case an electronic lock).

Figure 13:
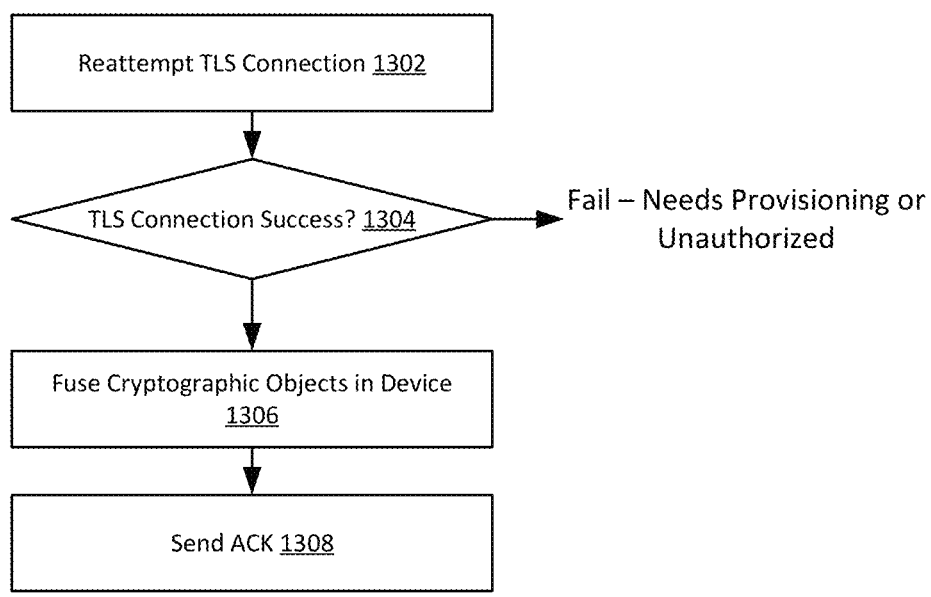
FIG. 13 is an example method performed by an electronic lock within the provisioning process of FIGS. 8-9, after server objects have been formed in accordance with the method of FIG. 11.

FIG. 13 is an example method performed by an electronic lock within the provisioning process of FIGS. 8-9, after server objects have been formed in accordance with the method of FIG. 11. Specifically, once the server 300 terminates the connection to the electronic lock 100 (e.g., at step 1114 of FIG. 11), the electronic lock will, at 1302, reattempt a TLS connection to the server. At 1304, the lock determines whether the TLS connection is a success; if it is not a success, either the lock is unauthorized or needs to be provisioned, as noted above in connection with FIG. 10. However, if the lock successfully connects, the lock will then know that it has successfully been provisioned. At 1306, the electronic lock will fuse the objects it has in storage into the device, for example by performing a one-time write of cryptographic objects associated with the device certificate into the security chip 137.

III. Electronic Lock Installation and Certificate Usage

Figure 14:
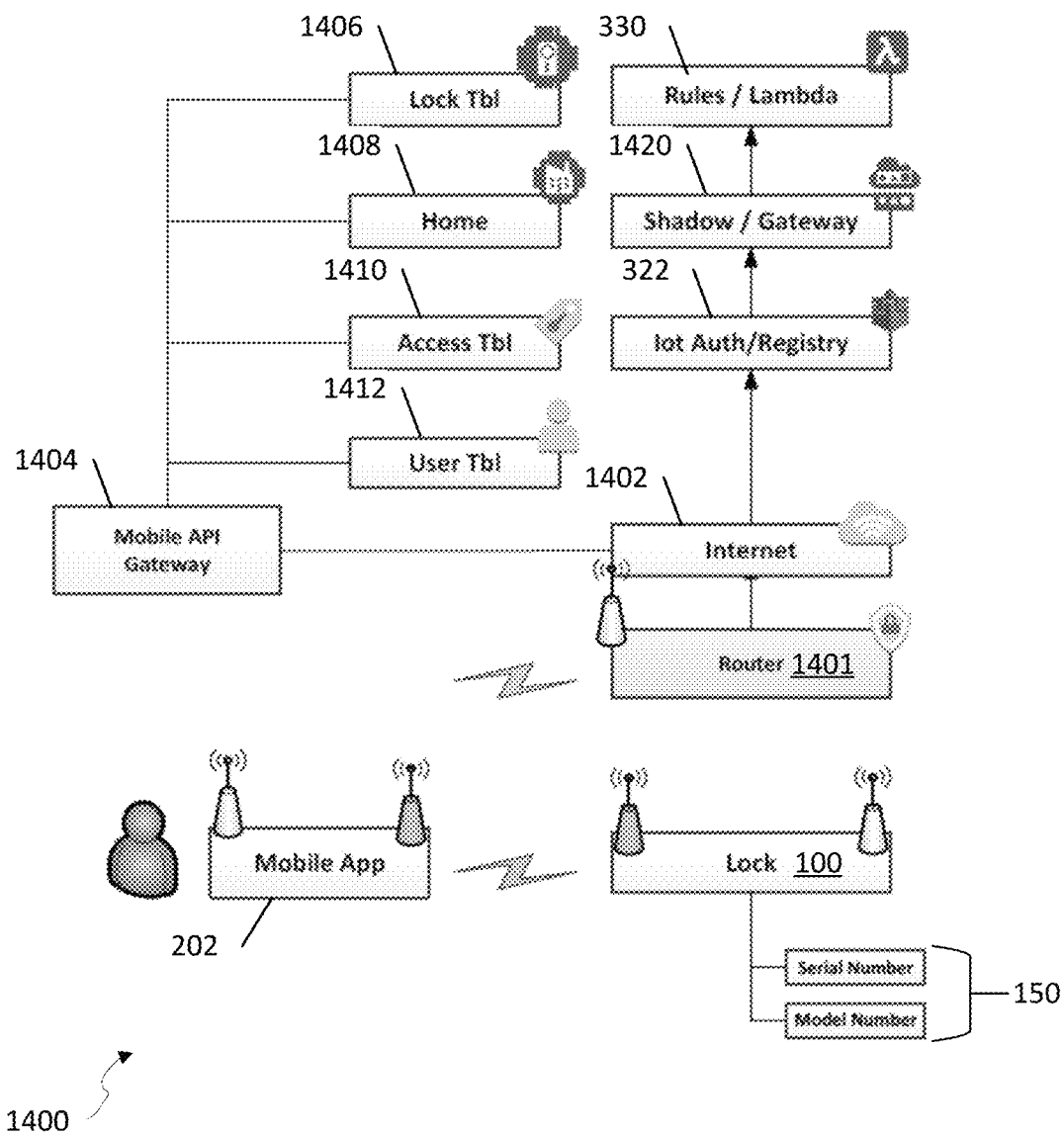
FIG. 14 is a block diagram of a system including an electronic lock as installed at a user premises, in association with example aspects of the present disclosure.
Figure 15:
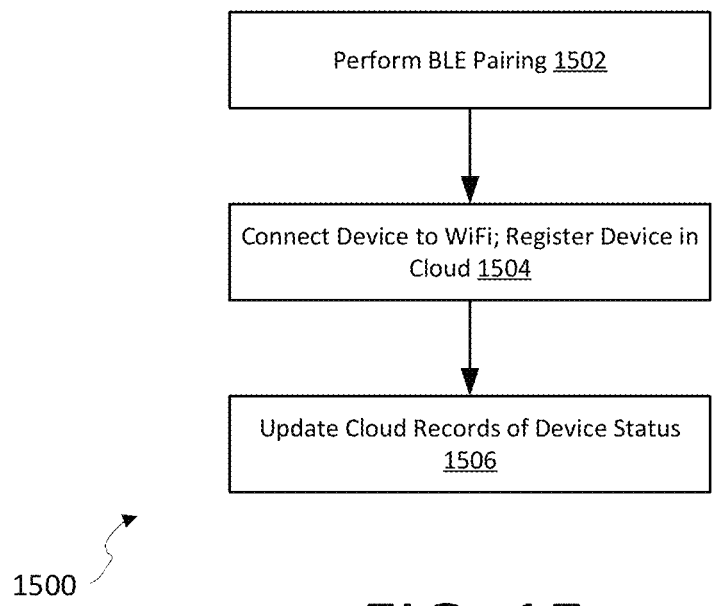
FIG. 15 is an example generalized method of associating an electronic lock with a user account at a server, in association with example aspects of the present disclosure.
Figure 16:
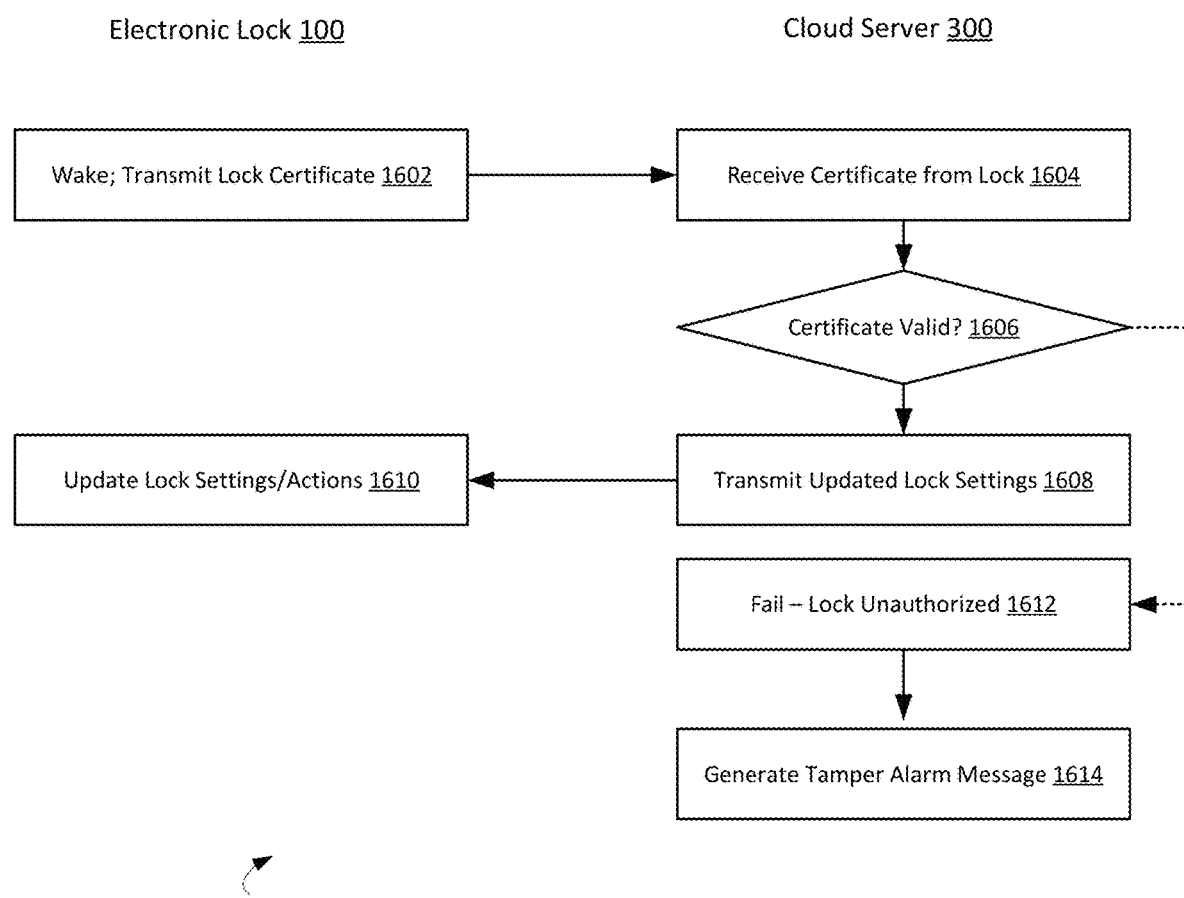
FIG. 16 is an example method of communicating with a cloud server by an electronic lock provisioned according to the methods and systems disclosed herein.

Referring to FIGS. 14-16, methods and systems used during installation and usage of an electrical lock 100 are briefly described to illustrate advantages of the provisioning process described above. FIG. 14 is a block diagram of a system 1400 including an electronic lock as installed at a user premises, in association with example aspects of the present disclosure. In the example shown, the electronic lock 100 establishes wireless communication with a mobile device 200 having a mobile application 202 installed thereon. The mobile device 200 and electronic lock 100 can be paired by way of a Bluetooth connection as previously mentioned. In the example as shown, the lock has included a serial number and model number (lock identification 150). The lock also communicates with router 1401 to communicate with either an IOT registry 324 (and corresponding shadow gateway 1420 and rules engine 330), or a mobile API Gateway 1404 via the Internet 1402, depending on whether the lock was previously provisioned and registered at the server 300. At the mobile API gateway 1404, the lock 100 and/or mobile application 202 can access various virtual lock records and associate a user with a pre-provisioned electronic lock. In particular, existing locks are stored in a lock table, and can be associated with users included in a user table 1412. A home table 1408 is a virtual container which can be associated with a plurality of locks and/or users, and an access table 1410 outline access attempts and/or current access status of particular locks.

FIG. 15 is an example generalized method 1500 of associating an electronic lock with a user account at a server, in association with example aspects of the present disclosure. The method 1500 is generally instantiated by a user of a mobile device having the mobile application 202 installed thereon. At 1502, the user will perform a BLE pairing process, for example by pressing an activation button on the electronic lock 100. The BLE pairing process can include, for example, pressing a pairing button on the electronic lock, and in response, the electronic lock indicating that there is a device available for pairing on the lock, and in the BLE advertising data. The mobile application 202 can then perform a BLE discovery process and find the lock. A user can select the desired lock for pairing.

At 1504, once the BLE pairing process completes, the mobile application 202 can determine a lock type and the lock can scan for networks to which it can connect. The user can select an appropriate wireless network for pairing of the lock; once the lock successfully connects to a wireless (e.g., Wi-Fi) network, at 1506, the lock can transmit information to the server 300, updating cloud records of the device status by associating the lock with a particular user, home account, and/or access log.

Once the cloud objects for the virtual lock record have all been created, the cloud will update the activation status of the device in the virtual lock record at the server 300. The mobile application will then notify the lock to connect to the virtual lock record and the activation status flag will indicate to the device that the process is complete. The mobile application 202 will set the activation flag on the lock table to indicate that lock status is complete. The electronic lock 100 will notify the mobile application 202, and the activation process will be complete. The mobile application 202 can set the time and time zone for the lock, and then start the property and attribute discovery process for the lock. Once complete, the lock will become discoverable within the mobile application 202 to the user.

FIG. 16 is an example method 1600 of communicating with a server by an electronic lock provisioned according to the methods and systems disclosed herein. The method 1600 can be instantiated at an electronic lock 100. At 1602, the method includes the electronic lock regenerating and transmitting a lock certificate to the server 300. At 1604, the server receives the device certificate from the lock. If, at 1606, the certificate is determined as valid (e.g., a TLS connection is successfully established, as noted above in connection with FIG. 10), at 1608 the server 300 can transmit updated lock settings to the electronic lock 100. The updated settings can be, for example, settings that are updated from either the electronic lock 100 or from a mobile application 202 of a mobile device 200, which are then sent to the electronic lock 100 when settings at the virtual lock record at the server 300 are updated at the electronic lock 100.

However, it is noted that, at 1606, if the certificate is determined to not be valid, this may be because the electronic lock was not previously provisioned, or because some change occurred to the device or its connection to the server. Accordingly, any changes to such devices that may result in an inability to validate the regenerated device certificate against the public version of the certificate at the server 300 result in invalidation of the electronic lock at 1612, and would occur in response to possible tampering events.

In example embodiments, where, at 1606, the certificate is determined to not be valid, a tamper alarm could be generated at 1614, e.g., at the server 300. The tamper alarm can be, in various embodiments, one or more of an email, a text message, an automated voice message, or an application notification. Such a notification could be sent to the owner user of the electronic lock to notify that user of invalidity of the electronic lock, or could be sent to an administrator user of the server 300, e.g., to allow notification to a cloud administrator or a manufacturer or provisioning entity that the lock certificate is invalid.

Referring now to FIGS. 1-16 overall, it is noted that the provisioning process described herein provides a hardened device that establishes a secure, immutable, and mutually authenticated channel between the electronic lock 100 and server 300. Specifically, the construction of the certificate within the electronic lock allows the unique properties of all the components that make up the lock to be wrapped into an immutable certificate that is stored within a device that is itself immutable. This ensures that if an outside party attempts to tamper with or exchange a component within our overall lock design, then the certificates integrity will be violated and the previously secured connection will be revoked.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of configuring an electronic lock comprising:
generating a public-private key pair at a cryptographic circuit included in the electronic lock;
transmitting a certificate signing request to a certificate signer, the certificate signing request including a plurality of attributes of the electronic lock;
receiving a signed certificate from the certificate signer, the signed certificate including cryptographic data reflecting the plurality of attributes in the certificate signing request and being signed using a certificate affiliated with a manufacturer of the electronic lock;
configuring the signed certificate with a target server endpoint;
connecting the electronic lock to a server at the target server endpoint; and
after receiving acknowledgement from the server, storing, in the cryptographic circuit, the cryptographic data received from the certificate signer and the target server endpoint, using a one-time write command, wherein the one-time write command locks the cryptographic circuit after storing the cryptographic data and affixes, at the electronic lock, an association between the electronic lock, the manufacturer of the electronic lock, and the target server endpoint, thereby preventing the cryptographic circuit from overwriting the cryptographic data and wherein the cryptographic data includes a certificate signing request of the electronic lock, a certificate of the manufacturer of the electronic lock, and data identifying the target server endpoint.

2. The method of claim 1, wherein connecting the electronic lock to the server includes transmitting the signed certificate to the server.

3. The method of claim 2, further comprising:
after storing the cryptographic data in the cryptographic circuit, transmitting a connection request from the electronic lock to the server, the connection request including a recalculated version of the signed certificate generated by the cryptographic circuit; and
based on the recalculated version of the signed certificate corresponding to the signed certificate at the server, authenticating the electronic lock at the server.

4. The method of claim 2, further comprising storing the signed certificate in a secure storage of the electronic lock.

5. The method of claim 1, further comprising, at the certificate signer, signing the certificate with a signature of the manufacturer of the electronic lock.

6. The method of claim 1, wherein connecting to the server at the target server endpoint comprises:
forming a secured connection to the server at the target server endpoint;
based on the server determining that the electronic lock was not previously registered at the server, performing a device registration process, the device registration process including creation of a plurality of server objects defining a virtual electronic lock record associated with the electronic lock.

7. The method of claim 6, wherein the plurality of server objects includes a virtual device and a policy, and wherein the signed certificate is stored in association with the virtual device and the policy at the server.

8. The method of claim 6, wherein the device registration process further includes determining whether the electronic lock is authorized to be registered at the server.

9. The method of claim 1, wherein receiving the signed certificate includes a certificate name, an issuer identifier associated with a manufacturer of the electronic lock, a serial number of the electronic lock, and validity data.

10. An electronic lock comprising:
a processing unit;
a locking bolt movable between a locked and unlocked position;
a motor actuatable by the processing unit to move the locking bolt between the locked and unlocked positions;
a wireless communication interface operatively connected to the processing unit; and
a cryptographic circuit having a one-time write function to store cryptographic information that is generated based on a plurality of attributes of the electronic lock and information identifying a target server endpoint, the one-time write function locking the cryptographic circuit after storing the cryptographic information and affixing, at the electronic lock, an association between the electronic lock, a manufacturer of the electronic lock, and the target server endpoint, thereby preventing the cryptographic circuit from overwriting the cryptographic data and wherein the cryptographic data includes a certificate signing request of the electronic lock, a certificate of the manufacturer of the electronic lock, and data identifying the target server endpoint; and a memory operatively connected to the processing unit and storing computer-executable instructions which, when executed by the processing unit, cause the processing unit to:
upon initiating communication with a server identified by the cryptographic information, transmitting, via the wireless communication interface, a certificate to the server that is generated based on the cryptographic information.

11. The electronic lock of claim 10, wherein the certificate comprises a signed certificate received from a certificate signer associated with a manufacturer of the electronic lock.

12. The electronic lock of claim 11, wherein the certificate signer comprises a cloud provisioning server.

13. The electronic lock of claim 10, wherein transmitting the certificate to the server validates that, prior to communication with the server, the electronic lock is authorized to communicate with the server and has not been tampered with.

14. A method of configuring a server account associated with an electronic lock, the method comprising:
receiving a first secure connection request from an electronic lock, the first secure connection request including a certificate generated by the electronic lock and including a plurality of attributes of the electronic lock;
based on the server determining, from the certificate information, that the electronic lock is authorized to communicate with the server but has no corresponding server record:
determining whether the electronic lock is an authorized electronic lock by comparing an identifier of the electronic lock received in the certificate to a permission list;
establishing a virtual device and a policy at the server;
associating the policy with the virtual device;
associating the certificate with the policy;
activating the certificate; and
transmitting an acknowledgement of activation of the certificate to the electronic lock;
receiving a second secure connection request from the electronic lock after a connection to the electronic lock based on the first secure connection request is terminated, the second secure connection request including an instance of the certificate generated at the time of the second secure connection request; and
confirming that the electronic lock is authorized to communicate with the server, thereby causing the electronic lock to store cryptographic data used to create the certificate and target server information identifying the server into a cryptographic circuit of the electronic lock using a one-time write command, the one-time write command locking the cryptographic circuit of the electronic lock after storing the cryptographic data and affixing, at the electronic lock, an association between the electronic lock, a manufacturer of the electronic lock, and the server.

15. The method of claim 14, further comprising:
based on the server determining, from the certificate information, that the electronic lock is authorized to communicate with the server and has been registered at the server, authorizing communication with the electronic lock.

16. The method of claim 14, further comprising:
based on the server determining, from the certificate information, that the electronic lock is not authorized to communicate with the server and has not been registered at the server, generating a tamper alarm.

17. The method of claim 16, wherein the tamper alarm is addressed to an owner user of the electronic lock and comprises at least one of an email, a text message, an automated voice message, or an application notification.

18. The method of claim 16, wherein the tamper alarm is addressed to an administrator of the server.

* * * * *